No. 767,065. Patented August 9, 1904.

UNITED STATES PATENT OFFICE.

WILLIAM A. KÖNEMAN, OF CHICAGO, ILLINOIS.

METHOD OF PRODUCING PLASTER-OF-PARIS.

SPECIFICATION forming part of Letters Patent No. 767,065, dated August 9, 1904.

Application filed December 28, 1903. Serial No. 136,909. (No specimens.)

*To all whom it may concern:*

Be it known that I, WILLIAM A. KÖNEMAN, a citizen of the United States, residing at Chicago, in the county of Cook and State of Illinois, have invented a new and useful Method of Producing Plaster-of-Paris, of which the following is a specification.

My object is to provide an improved method for the production of plaster-of-paris and the like from gypsum-bearing rock whereby a product of better grade may be obtained from that class of raw material and in a manner more economical than has been possible by any other method hitherto practiced and of which I am aware.

Gypsum-bearing rock as it comes from the quarry usually has incorporated with it a more or less large per cent. of foreign or bone rock, which is so intimately interlaced with the gypsum constituent that even approximately complete separation thereof has hitherto, so far as I am aware, been considered impossible.

The process of producing plaster-of-paris from gypsum-rock now generally in vogue consists in first crushing the rock, so that it will all pass through a screen of approximately one-inch mesh, then drying the crushed rock, then pulverizing the same, usually in bur-mills, and, finally, dehydrating or calcining the pulverized mass in calcining-kettles. The foreign or bone rock is usually dark in color and much harder than the gypsum-rock proper, and when the two are ground together in a bur-mill the presence of the bone-rock has a tendency to effect unduly-rapid wear of the bur-mills, reduces the output thereof, increases the power necessary for their operation, and prevents the desired even pulverization of the gypsum constituent. Furthermore, when the mixed pulverized mass is calcined the finished plaster-of-paris is weakened in strength proportionately to the bone-rock present and is discolored by the dark powder of the bone-rock.

When gypsum-rock is pulverized, it is broken up into small cubical crystals, which swell during calcination, so that the finished product even though initially finely pulverized becomes comparatively coarse. In order that the finished product produced by calcination after pulverization shall be of great strength and be capable of a fine finish, it is necessary to subject it again to pulverization. Such double-ground product is nearly fifty per cent. stronger when worked and set than the product from the same rock not reground. This is due to the fact that more perfect interlacing of atoms is secured with finely-ground material in all cement-like substances.

In practicing my improved method I first subject the gypsum-rock as it comes from the quarry to a fine crushing operation to reduce it to a condition wherein the bone or other hard rock constituents are left in a more or less coarse granular state. I then subject the crushed mass to heat in a suitable furnace at a temperature and for a period of time which will calcine the gypsum constituent to the desired degree of dehydration and render it particularly friable, while any other rock constituents remain comparatively hard. I then pass the calcined mass through a pulverizer, preferably of the well-known pebble-mill type, so regulated that the friable gypsum constituent will be reduced to a very fine degree of pulverization, while the harder constituents for the most part remain practically unaffected or at least of coarser mesh. I finally subject the pulverized mass to a sifting operation, which separates the coarser foreign material from the finely-reduced gypsum.

My improved method may be practiced with results that may be considered satisfactory from a commercial standpoint by the use of any one of several furnaces and pulverizers of known construction that have been employed for other purposes. Therefore, although I have devised and employ in the practice of my present method and with results that are eminently satisfactory from every standpoint a furnace of special construction, it is not thought necessary to illustrate and describe the same in the present connection.

What I claim as new, and desire to secure by Letters Patent, is—

The herein-described method of producing plaster-of-paris from gypsum-rock, which consists in crushing the rock, then subjecting it to heat whereby the gypsum constituent is calcined and dehydrated to the desired degree, then subjecting the mass to further disintegration thereby reducing the gypsum constituent to a fine powder and leaving the other constituents in a coarser state, and then sifting off and saving the gypsum constituent, substantially as and for the purpose set forth.

WILLIAM A. KÖNEMAN.

In presence of—
 WALTER N. WINBERG,
 L. HEISLAR.